Feb. 8, 1944.  J. W. RHODES ET AL  2,341,061
COMBINATION MACHINE
Filed May 26, 1941  7 Sheets-Sheet 1

INVENTORS,
JOHN W. RHODES,
HENRY L. NIEMEYER,
By Minturn & Minturn,
ATTORNEYS.

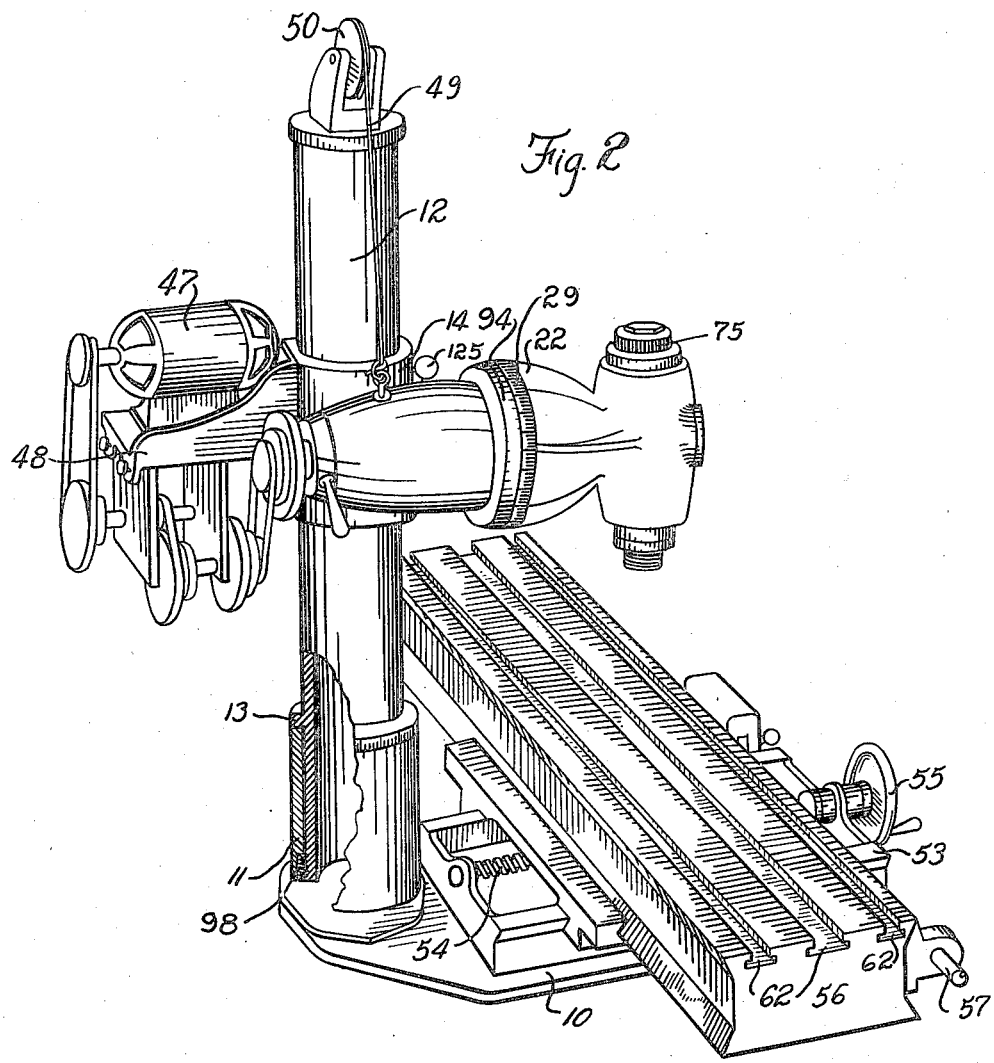

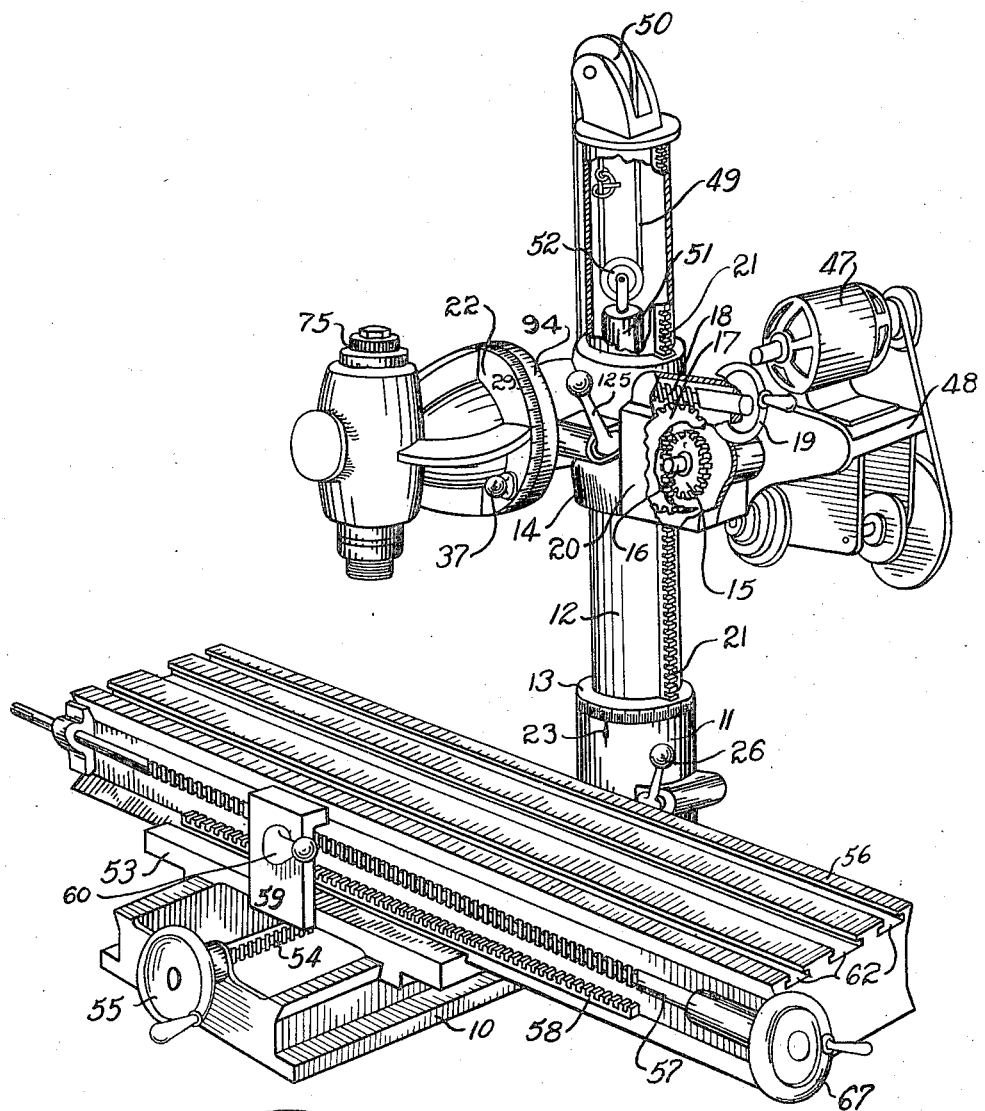
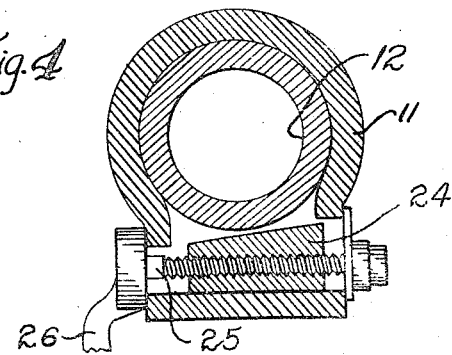
Fig. 4
Fig. 3
INVENTORS,
JOHN W. RHODES,
HENRY L. NIEMEYER,
BY Minturn Minturn
ATTORNEYS.

Feb. 8, 1944. J. W. RHODES ET AL 2,341,061
COMBINATION MACHINE
Filed May 26, 1941 7 Sheets-Sheet 7
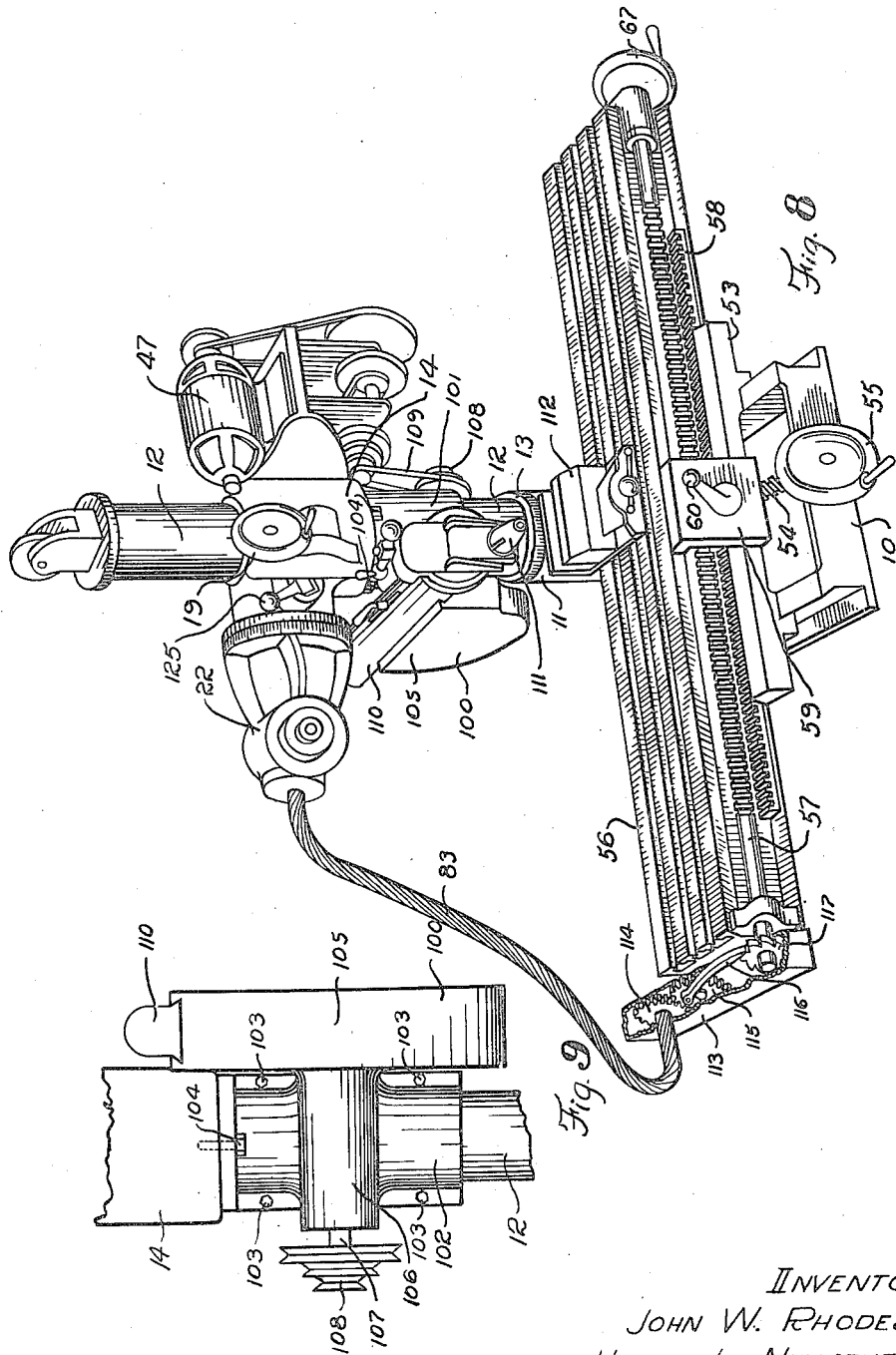
INVENTORS,
JOHN W. RHODES,
HENRY L. NIEMEYER,
BY Minturn Minturn,
ATTORNEYS.

Patented Feb. 8, 1944

2,341,061

UNITED STATES PATENT OFFICE 2,341,061

COMBINATION MACHINE

John W. Rhodes and Henry L. Niemeyer, Indianapolis, Ind.

Application May 26, 1941, Serial No. 395,210

6 Claims. (Cl. 29—27)

This invention relates to a machine for performing a very wide range of operations including drilling, vertical and horizontal boring, vertical and horizontal milling, tapping, morticing, fluting, routing, form cutting, surface grinding, sanding, buffing, polishing, turning, screw cutting, gear cutting, internal and external cylindrical grinding, circular saw and dado head work, jointing, planing, rabbeting, shaping, jig sawing, carving, and the like on any machinable material such as metal, wood, fiber, plastics, etc.

A primary object of the invention is to provide a construction by which all of the foregoing operations may be performed by the one machine, simply by changing the position of a driving head and by adding or taking away from the machine certain supplementary tables and adapting devices. The primary advantage of the invention is that in the one machine an extremely wide range of operations may be carried out without having to use the heretofore well-known separate machines, which of course would require sufficient floor space for their individual mounting. With our invention, the one machine may be set up within a limited space, particularly such as may be available aboard ships and on trucks to follow mechanized army units, to be useful in oil fields, and in fact any place where it is not convenient or feasible to carry the work to a machine shop.

Figure 1:
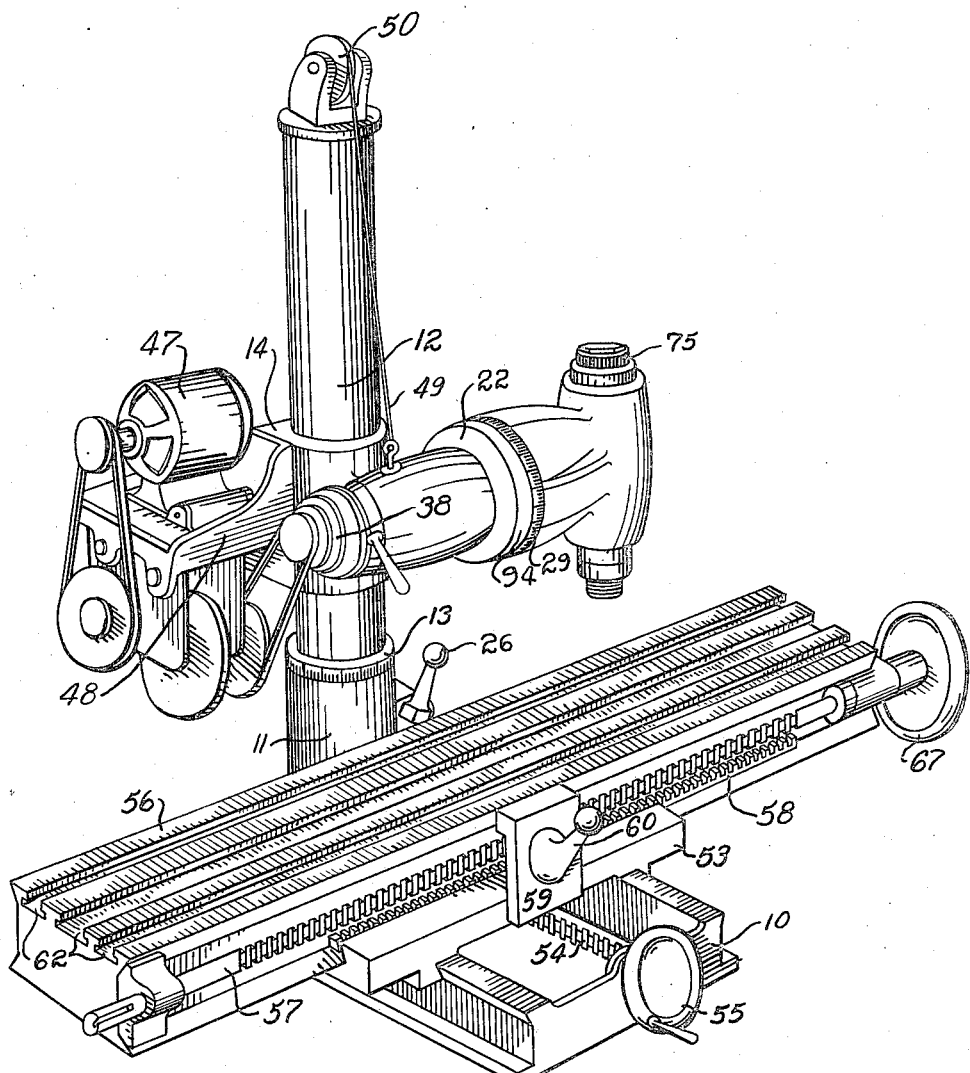
Figure 5:
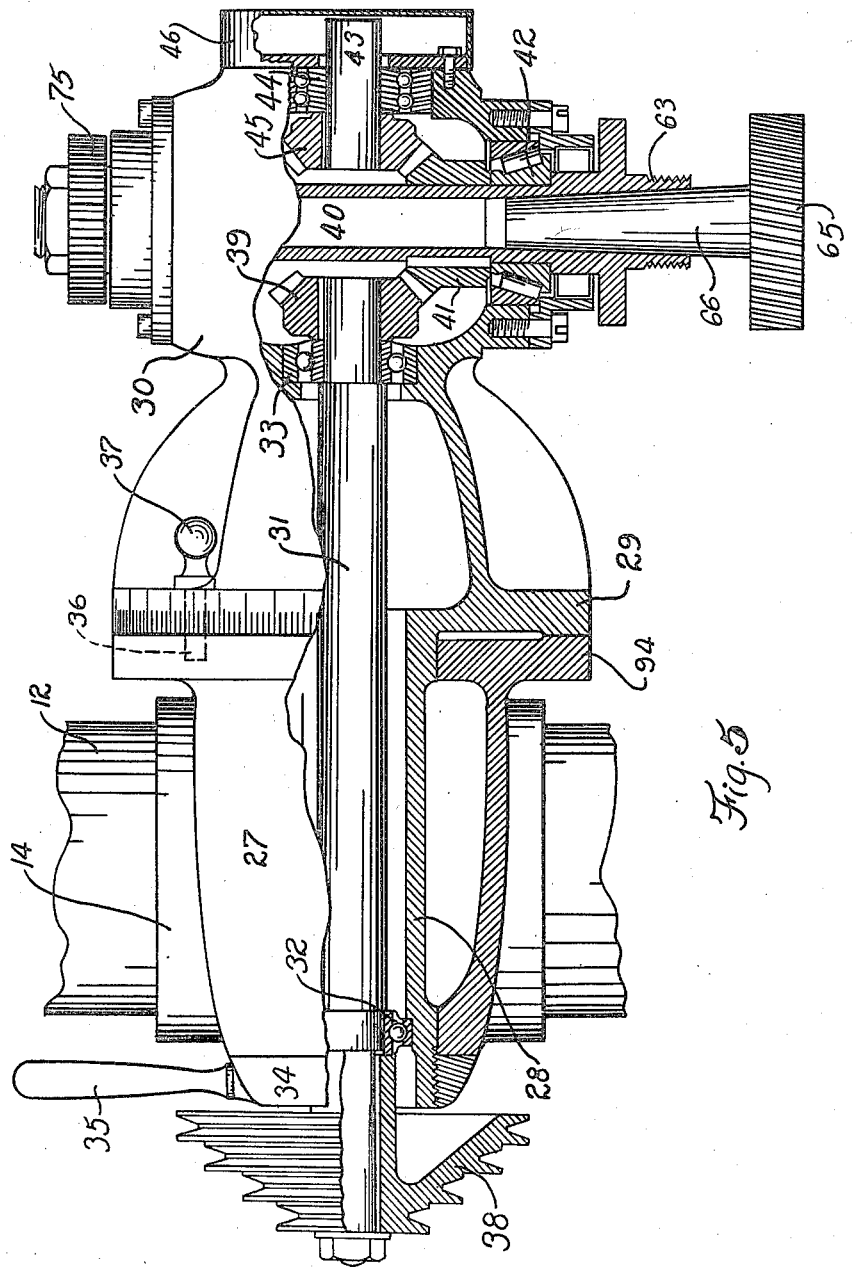
Figure 6:
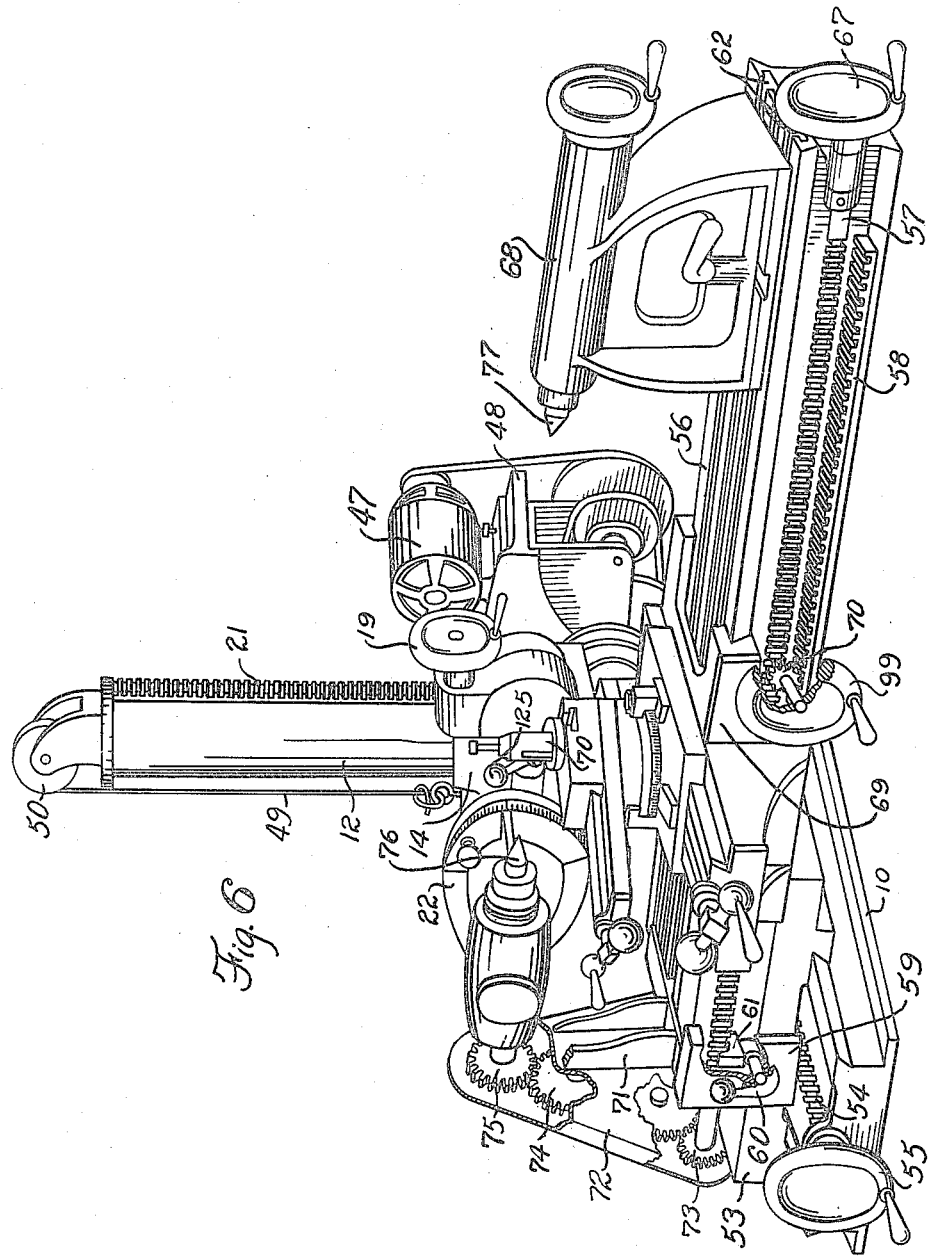
Figure 7:
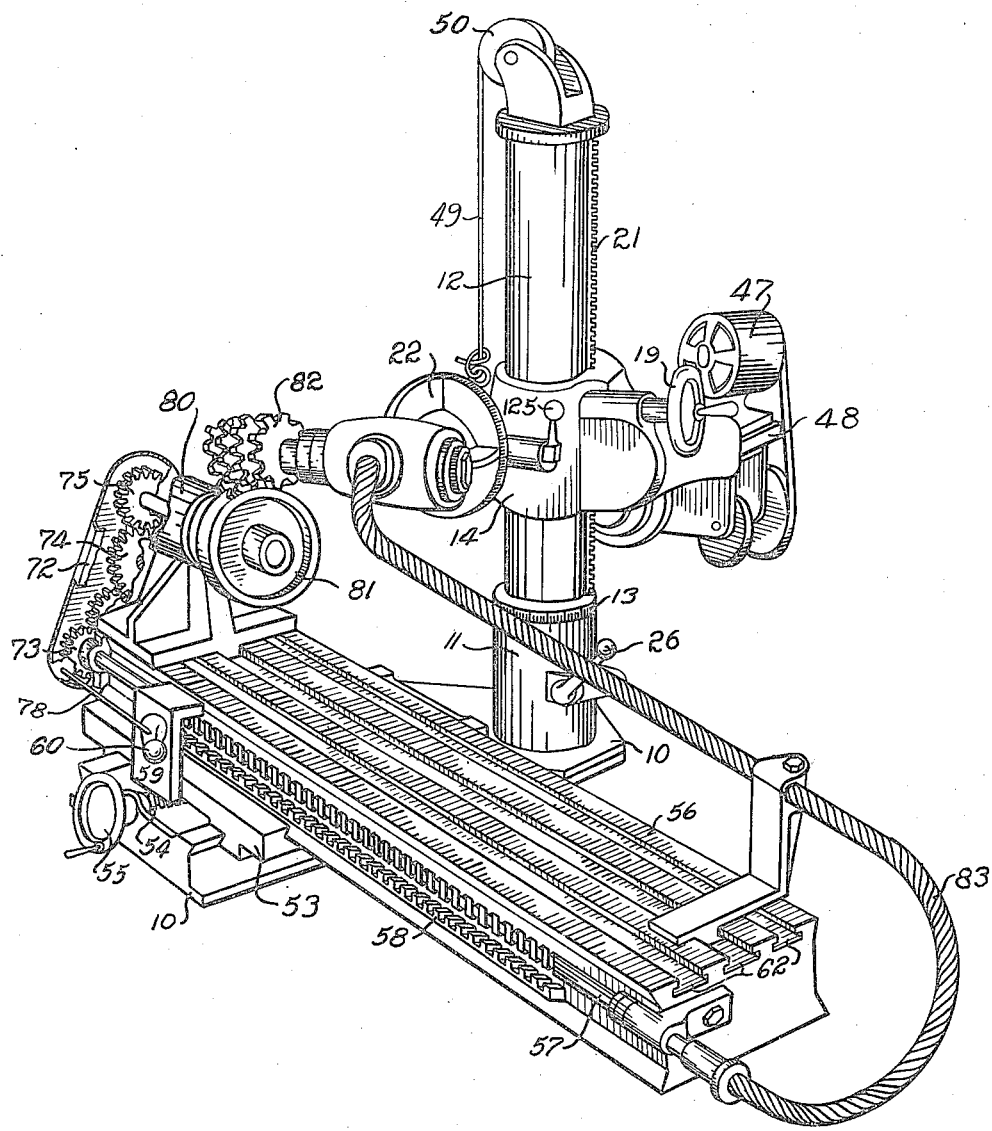

Other important objects and advantages of the invention will become apparent to those versed in machine shop practice and in the use of machines in general in the following description of one particular form of the invention as illustrated in the accompanying drawings, in which Fig. 1 is a front view in perspective from the left-hand end of a machine embodying the invention;

Fig. 2, a view in perspective from the rear side of the left-hand end of the machine;

Fig. 3, a view in perspective of the machine from the right-hand end;

Fig. 4, a view in detail in section on an enlarged scale of the column positioning means;

Fig. 5, a view in side elevation and in partial section on an enlarged scale of the universal driving head of the machine;

Fig. 6, a view in perspective of the machine from the right-hand end, showing the machine set up to operate as an engine lathe;

Fig. 7, a view in perspective from the right-hand end of the machine, showing it set up for gear hobbing or the like;

Fig. 8, a view in front left-hand perspective of the machine set up for planing; and Fig. 9, a view in detail on an enlarged scale in rear elevation of the mounting of the planer attachment.

Like characters of reference indicate like parts throughout the several views in the drawings.

Upon a suitable bed 10 is mounted at the rear thereof a tubular base 11 within which is telescoped by its lower end a column 12. As best indicated in Fig. 2, the column 12 has an annular collar 13 fixed thereto, herein shown as being integral with the column 12, to have this collar 13 bearing on the top end of the base 11—the lower end of the column 12 terminating to carry a locking collar 98 which fits in a counterbore in the column 12 and screw-threadedly engages the column 12.

Surrounding the column 12 is a sleeve 14, so formed as to permit the sleeve 14 to be shifted in guided relation vertically along the column 12 above the collar 13. Preferably the sleeve 14 is shifted on the column 12 by some positive means, herein shown as by a spur gear 15, Fig. 3, mounted on a shaft 16, which in turn has fixed thereto a worm wheel 17 in constant mesh with a worm 18 rotated on its axis by a hand wheel 19; all of these parts, with the exception of the hand wheel 19, being preferably carried within a suitable housing 20 extending from the sleeve 14 and so arranged that the spur gear 15 is in constant mesh with a rack gear 21 fixed vertically along the outer side of the column 12. Thus, by suitable turning of the hand wheel 19, the sleeve 14 may be raised or lowered along the column 12.

By reason of the rack gear 21 being mounted on the column 12 to project outwardly therefrom, this rack gear serves as a key upon passing through the sleeve 14 to prevent horizontal turning of the sleeve 14 around the column 12.

The universal head, generally designated by the numeral 22, is carried by the sleeve 14 and may be shifted to any position 360° around the axis of the column 12 by rotating the column 12 on its axis. Preferably, although not necessarily so, the outer peripheral face of the collar 13 is marked off in degrees so that the desired degree of rotation of the column 12 may be had in reference to a base point such as the arrow 23, placed on the support 11 immediately under the collar 13. The column 12 may be fixed in any position of axial rotation by any suitable means, herein shown as by a nut 24, Fig. 4, through which a screw threaded shaft 25 passes to advance or retract the nut from the column 12 within the support 11 by means of an externally positioned lever 26 secured on the shaft 25.

The universal head 22 is best described in reference to Fig. 5 of the drawings, wherein the head is shown separately and on an enlarged scale. A housing 27 is fixed to the sleeve 14 and receives horizontally therethrough the tube 28 axially extending from the cap 29. This cap 29 has formed on its outer end a gear housing 30. A drive shaft 31 is carried by a suitable bearing, such as the ball bearing 32 mounted inside of the tube 28, and by another bearing, such as the ball bearing 33 positioned in the back end of the gear housing 30.

The cap 29 is normally pulled against a face formed on the flange 94 of the housing 27 by means of a nut 34 which screw threadedly engages around the outside of the tube 28 about that portion which extends beyond the housing 27. For convenience, the nut 34 carries an operating handle 35 so that the nut 34 may be released readily in order to permit axial shifting of the cap 29 in reference to the housing 27 and then to permit securing the cap 29 in a fixed manner in its shifted position. For certain normally used positions of the cap 29, a pin 36, operated by an external head 37, is employed to pass through a part of the cap 29 and engage within a socket formed in the face of the flange 94. The cap 29, as indicated, may be marked off in degrees for indexing the cap around the flange 94.

The shaft 31 extends outwardly beyond the bearing 32, beyond the nut 34, to receive thereon in a fixed manner a suitable driving member, herein shown as a stepped V-belt drive pulley 38. On the other end of the shaft 31, ahead of the bearing 33, is fixed thereon a bevel gear 39. Extending transversely across the gear housing 30 is a tubular shaft 40, on which is fixed within the housing a bevel gear 41 to be in constant mesh with the gear 39. This tubular shaft 40 is mounted at the top and bottom ends of the housing 30 on suitable anti-friction bearings, the lower bearing 42 being shown as one example. This shaft 40 extends from the opposite ends of the housing 30 so as to be accessible by both ends for the mounting thereon or therewith of suitable tools or driving members, as will be further explained.

From the outer end of the housing 30 extends a stub shaft 43 that is supported in any suitable manner, such as by the bearing 44, and is driven by means of a bevel gear 45 in constant mesh with the bevel gear 41. Preferably this shaft 43 is covered over when not in use by any suitable means such as by the cap 46.

Thus it is to be seen that there are in effect three driving members available at the gear housing 30.

While the machine may be driven in any suitable manner from a line shaft or the like, it is preferably individually driven by a suitable means, such as by an electric motor 47, which is herein shown as being mounted on a bracket 48 that is attached to and supported by the sleeve 14. Suitable speed reduction means is interposed between the motor 47 and the driven pulley 38. In the form herein shown, the driving and speed reduction means consists of V-belts operating between the motor 47 and pulleys on jackshafts with a final V-belt drive to the pulley 38. The exact arrangement and construction of this drive between the motor 47 and the pulley 38 does not form a part of the present invention to be claimed herein. Since the head 22 and its driving motor 47 are both carried on the sleeve 14, considerable weight is thus supported by the sleeve 14 and, in order to counter-balance this weight to some extent at least, a flexible member, such as a cable 49, is fixed by one end to the head 22 and carried upwardly and around over a pulley 50 mounted on the top end of the column 12 in the present showing, from which pulley 50, the cable 49, Fig. 3, is carried downwardly within the column 12 to carry the counter-balance weight 51 by passing the cable 49 around a pulley 52 fixed to the weight 51 and then carrying the cable back up and securing it within the column 12 at its upper end. The sleeve 14 may be selectively fixed in position along the column 12 by rocking the lever 125 which controls suitable mechanism, such as a half-nut (not shown) for that purpose as is well known to those versed in the art.

On the base 10 is mounted a carrier 53 to be guided thereby and be shifted thereover by means of screw shaft 54 operated by a hand wheel 55, whereby the carrier 53 may be shifted rearwardly toward the support 11 and forwardly away from it. Then on top of the carrier 53 is mounted a bed 56, in such a manner that it may be shifted laterally across the carrier 53. The forward side of the bed 56 has mounted thereon a lead screw 57 in the nature of a lathe lead screw, and has the left hand end thereof extended on beyond the bed 56 for a purpose which will later be described. Also the bed 56 carries fixed thereto and below the lead screw 57 a rack gear 58, the purpose of which will also later be described. On the carrier 53 is fixed a bracket 59 to extend upwardly on the forward side of the lead screw 57. This bracket 59 carries a lever 60 which may be rocked to the left to cause a half-nut 61 to engage with the lead screw 57, whereby rotation of the screw 57 will cause the bed 56 to be shifted laterally of the carrier 53. Shifting the lever 60 to the right disengages the half-nut 61 from the lead screw 57 so that rotation then of the lead screw 57 will not cause travel of the bed 56. As indicated, the upper side of the bed 56 is preferably provided with a plurality of T slots 62, herein shown as three in number.

Now for straight drilling work, the head 22 may be put in that position as shown in Figs. 1–3, to have the shaft 40 vertically positioned over the bed 56, on to which bed 56 the work may be clamped. The drill holder, such as a chuck (not shown) may be attached to the end of the shaft 40, herein shown as having an externally threaded portion 63, Fig. 5. Of course the head 22 may be raised or lowered on the column 12 to obtain desired elevation and also to follow through with pressure on the drill by manipulation of the hand wheel 19. Where the work requires horizontal boring, the pin 37 may be withdrawn, the head locking nut 34 released, and the cap 29 shifted to change the shaft 40 to the required horizontal or angular position as required for the particular job and then the cap 29 secured in that position.

In the same manner, the shaft 40 may drive a milling cutter 65, Fig. 5, herein shown as being carried on a tapered shank 66 inserted within a tapered bore provided in the shaft 40. Obviously, the head 22 may be shifted around to have the cutter 65 perform horizontal or vertical cutting operations on work mounted on the bed 56. The bed 56 of course may be caused to travel relative to the cutter 65 by manipulation of the hand wheels 55 and 67, hand wheel 67 being mounted on the right hand end of the lead screw 57.

Referring now to Fig. 6, the machine is shown set up to operate in the manner of a lathe. A tailstock 68 is mounted on the top side of the bed 56 toward the right end thereof and a carriage 69 is positioned on the bed 56 to slide longitudinally thereof by engagements with the top overhanging edges. On the carriage 69 is mounted a tool holder 70, herein shown as being on an indexing head, as is common practice for universal operations. The details of the structures of the carriage 69 and the tool holder 70 with this supporting head do not per se enter into the present invention and hence are not shown in detail. It is sufficient for the present showing to state that the carriage 69 is shiftable along the bed 56, preferably by some suitable hand operated means, such as through the hand wheel 99 which turns a pinion gear 70 that is in constant mesh with the rack gear bar 58.

On the left hand end of the bed 56 is secured, by any suitable means such as by a bracket 71, a gear housing 72 which carries a train of gears therein. The lowermost gear 73 in this train is formed to receive axially therethrough the left hand extending end of the lead screw 57 with a driving connection. The upper gear 74 of this train is so positioned that when the universal head 22 is brought up into juxtaposition with the housing 72 with the shaft 40 in the horizontally disposed position, a gear 75 fixed on the shaft 40 may mesh with that gear 74.

Then in the internally tapered bore of the shaft 40 is inserted a center 76 to be in axial alignment then with the tailstock center 77. It is to be noted that means are provided for automatically shifting the lever 60 to release the half-nut 61 from driving connection with the lead screw 57 when the gear train housing 72 is positioned at the end of the bed 56. This means consists essentially of a pin 78 in the path of the upper end of the lever 60 and of such length that when the gear train 72 is seated against the end of the bed 56, the lever 60 will have been rocked to the disengaging position. Then by suitable mechanism (not herein shown, since such mechanism is in common usage), the carriage 69 may be driven by the lead screw 57 at will, since the lead screw 57 is being driven at all times that the center 76 is being driven. It is obvious of course that a face plate may be used either in conjunction with or without the center 76, and be carried on the threaded end 63 of the shaft 40. Thus it is to be seen that the machine so set up may operate as a common engine lathe.

Another possible setup of the machine is indicated in Fig. 7, wherein the gear train 72 above described is mounted on the end of the bed 56 and connected as before indicated with the lead screw 57. In this setup, however, a special head stock 80 is mounted on the bed 56 to carry work on a shaft driven from the gear train. In the form herein shown, a blank 81 is mounted on the head 80 to be revolved. The head 22 is positioned to bring a cutter 82 against the blank 81 by shifting the shaft 40 around away from the vertical position to some horizontal or incline position, as suggested in Fig. 7. Now in order to drive the blank 81, a flexible shaft 83 is connected to the lead screw 57 by one end, in place of the hand wheel 67. The other end of this flexible shaft 83 is connected to the stub shaft 43 by removing the cover plate 46. This is done to prevent having to remove the gear 75 from the shaft 40 in the present instance. Thus it is to be seen by this setup that power may be taken from the head 22 to drive the piece of work to be operated upon while the head 22 is also delivering power to operate the work cutting means.

Referring now to Figs. 8 and 9 in the drawings, the machine is shown in Fig. 8 as set up for planing operations. In this setup, a planing mechanism, generally designated by the numeral 100, is provided with a sleeve having the front and rear sections 101 and 102 respectively which slidingly fit around the column 12 to be secured one to the other by any suitable means, such as by the bolts 103 and then in turn secured to the sleeve 14 in abutment with its under edge by cap screws 104. Thus the planing mechanism 100 may be shifted up and down the column 12 in accordance with the shifting of the sleeve 14. The mechanism 100 may likewise be revolved around with the column 12. In the present setup, Fig. 8, the mechanism 100 is located to have the head travel at right angles across the bed 56.

The mechanism 100 comprises a housing 105 which is supported at one side of the sleeve 102 by means of an extension 106 thereacross, through which extends a driving shaft 107 carrying a cone pulley 108 on its outer end to be driven by the belt 109 through the various speed reducing pulleys in turn driven by the motor 47.

A reciprocating head 110 is mounted in guided relation across the top side of the housing 105 to be reciprocated in the usual and well known manner as employed for driving planer heads in general, the exact mechanism for changing the rotary travel of the shaft 107 to reciprocating travel of the head 110 not being shown herein in detail and not constituting a part of the invention per se. The head 110 carries the usual tool post 111. The work to be planed may be carried in any suitable manner on the bed 56 which, of course, may be shifted as before explained to vary the work in relation to the travel of the tool post 111. In the present showing, Fig. 8, a vise 112 is shown as being mounted on the bed 56 as a means for supporting the work. In this case, where the planer mechanism 100 is used, the bed 56 may be shifted by hand in reference to each stroke of the tool post 111.

To make the bed or table 56 automatically shiftable upon each stroke of the planer head 110, the flexible drive shaft 83, as shown in Fig. 7, is attached to the head 22 to be driven thereby as before described. The other end of this shaft 83 is then interconnected with the lead screw 57, Fig. 8, in a manner to permit a ratchet or intermittent movement of the lead screw 57 in timed relation with the travel of the planer head 110. While this ratchet drive may take any suitable form, a suggested form is herein shown wherein the shaft 83 is connected through a gear box 113 to a spur gear 114, the gear box being mounted on the end of the bed or table 56 to travel therewith. In mesh with the gear 114 is another spur gear 115 on the outer face of which is rockably mounted an arm 116 to drop by gravity by its free end against the ratchet wheel 117 that is positioned on the outer end of the lead screw 57. Thus when the gear 115 is turned, the arm 116 will be given a reciprocating action to pull it back and then advance it in relation to the ratchet wheel 117 to cause the corresponding intermittent travel. The timing of the travel of the screw 57 may, of course, be varied by any suitable manner, for instance such as by varying the size of the spur gear 114. Obviously the same ratchet mechanism may be connected to the cross feed screw 54 for cross travel of the bed 56 when desired. This would be occasioned upon certain positioning of the planer mechanism 100 about the column 12. Also it is obvious that a compound travel may be obtained by operating both screws 54 and 57 simultaneously.

Without describing in detail, it is obvious that many other combinations may be employed by suitable attachments, such as means for converting circular travel into reciprocating travel; for jig saw operation; special table means for supporting a planer knife to be driven by the shaft 40; etc. Obviously a circular saw may be mounted directly on the shaft 40 for sawing operations.

While we have herein shown and described our invention in the one particular form, it is obvious that structural changes may be employed without departing from the spirit of the invention, and we therefore do not desire to be limited to that precise form beyond the limitations as may be imposed by the following claims.

We claim:

1. The combination of a column vertically positioned, a collar shiftable longitudinally of the column, a driving head carried by the collar, driving head mounting means formed to permit selective positioning of the head throughout travel thereof about a horizontal axis, means permitting shifting and fixing of the head around a vertical axis, a plurality of drive members presented by said driving head, power transmission means carried by said collar for driving said driving members, said last head shifting means comprising a base carrying said column and on which base said column may be rotated on its own longitudinal axis, said collar being fixed against horizontal rotation relative to said column, a bed mounted adjacent said column and on which work may be carried, a lead screw mounted on the bed, drive connecting means for mounting on said bed to be engaged by one of said head drive members and also to be engaged by said lead screw, and a carriage carried by said bed connecting with said lead screw, another one of said head drive members being available for horizontal alignment over said bed to have the head serve in effect as a lathe headstock in conjunction with said bed and simultaneously drive said lead screw through said drive connecting means.

2. The combination of a column vertically positioned, a collar shiftable longitudinally of the column, a driving head carried by the collar, driving head mounting means formed to permit selective positioning of the head throughout travel thereof about a horizontal axis, means permitting shifting and fixing of the head around a vertical axis, a plurality of drive members presented by said driving head, power transmission means carried by said collar for driving said driving members, said last head shifting means comprising a base carrying said column and on which base said column may be rotated on its own longitudinal axis, said collar being fixed against horizontal rotation relative to said column, a bed mounted adjacent said column and on which work may be carried, a lead screw mounted on the bed, drive connecting means for mounting on said bed to be engaged by one of said head drive members and also to be engaged by said lead screw, and a carriage carried by said bed connecting with said lead screw, another one of said head drive members being available for horizontal alignment over said bed to have the head serve in effect as a lathe headstock in conjunction with said bed and simultaneously drive said lead screw through said drive connecting means, a carrier on which said bed is reciprocatably mounted, means carried by said carrier to engage selectively said lead screw whereby the bed is reciprocated by rotation of the screw, and means automatically disengaging said carrier lead screw engaging means upon mounting said drive connecting means on said bed.

3. The combination of a column vertically positioned, a collar shiftable longitudinally of the column, a driving head carried by the collar, driving head mounting means formed to permit selective positioning of the head throughout travel thereof about a horizontal axis, means permitting shifting and fixing of the head around a vertical axis, a plurality of drive members presented by said driving head, and power transmission means carried by said collar for driving said driving members, said last head shifting means comprising a base carrying said column and on which base said column may be rotated on its own longitudinal axis, said collar being fixed against horizontal rotation relative to said column, a bed mounted adjacent said column, a headstock mounted on said bed, a rotatable member carried by said headstock on which a piece to be worked upon may be carried, a lead screw carried by said bed, a flexible driving connection between one of said head driving members and said screw, and driving means between said screw and said headstock rotatable member, said driving head having available one of its said driving members for driving a tool to operate on said piece whereby said headstock shaft may revolve said work piece and said head may be left free to be shifted in reference to the work piece by reason of said flexible driving connection between it and said screw.

4. The combination of a support; a column telescoping with the support to extend vertically therefrom; a shoulder on the column forming a bearing on the support, said column being free to be rotated about its longitudinal axis in relation to the support; a collar carried about said column free to be shifted longitudinally thereof; a driving shaft carried by the collar; a head receiving an end of said shaft; means supporting the head from said collar to permit the head to be rotated at least 180 degrees on an axis in common with that of said shaft; means for selectively securing said head in any rotated position; a driven shaft carried by said head to have its ends exposed therethrough and to have its axis substantially normal to that of said driving shaft; a second driven member carried by said head having its rotation axis angularly disposed to that of the first driven member and normally exposed through said housing for driving connection with a selected externally presented member; a motor carried by said collar, and power transmission means between the motor and said driving shaft also carried by said collar; a base carrying said column support; a carrier on said base mounted to be traversable thereof forwardly and rearwardly in relation to said column; a bed mounted on said carrier to be laterally traversable thereof; a lead screw mounted on the bed; a carriage for mounting on said bed to be traversable thereof in conjunction with rotation of said lead screw; and power transmission means mountable on said bed and formed for selective engagement with said lead screw and one of said head driven shafts.

5. The combination of a support; a column telescoping with the support to extend vertically therefrom; a shoulder on the column forming a bearing on the support, said column being free to be rotated about its longitudinal axis in relation to the support; a collar carried about said column free to be shifted longitudinally thereof; a driving shaft carried by the collar; a head receiving an end of said shaft; means supporting the head from said collar to permit the head to be rotated at least 180 degrees on an axis in common with that of said shaft; means for selectively securing said head in any rotated position; a driven shaft carried by said head to have its ends exposed therethrough and to have its axis substantially normal to that of said driving shaft; a second driven member carried by said head having its rotation axis angularly disposed to that of the first driven member and normally exposed through said housing for driving connection with a selected externally presented member; a motor carried by said collar, and power transmission means between the motor and said driving shaft also carried by said collar; a base carrying said column support; a carrier on said base mounted to be traversable thereof forwardly and rearwardly in relation to said column; a bed mounted on said carrier to be laterally traversable thereof; a lead screw mounted on the bed; a carriage for mounting on said bed to be traversable thereof in conjunction with rotation of said lead screw; and power transmission means mountable on said bed and formed for selective engagement with said lead screw and one of said head driven shafts; means interconnecting said lead screw with said bed carrier to set up relative travel between said bed and carrier by screw rotation; and means interposed between said last lead screw-carrier connecting means and said bed mountable power transmission means automatically disengaging said lead screw-carrier upon said bed reaching a predetermined travel in relation to its said carrier.

6. The combination of a driving head; driving head mounting means formed to permit selective positioning of the head throughout travel thereof about a horizontal axis; means permitting the shifting and fixing of the head around a vertical axis; a plurality of drive members presented by said driving head; power transmission means for driving said driving members; a reciprocatably mounted bed, means for reciprocating the bed; and drive means connecting with one of said drive members and said bed reciprocating means.

JOHN W. RHODES.
HENRY L. NIEMEYER.